(No Model.)
J. W. DAY.
BORING MACHINE.
No. 482,231. Patented Sept. 6, 1892.
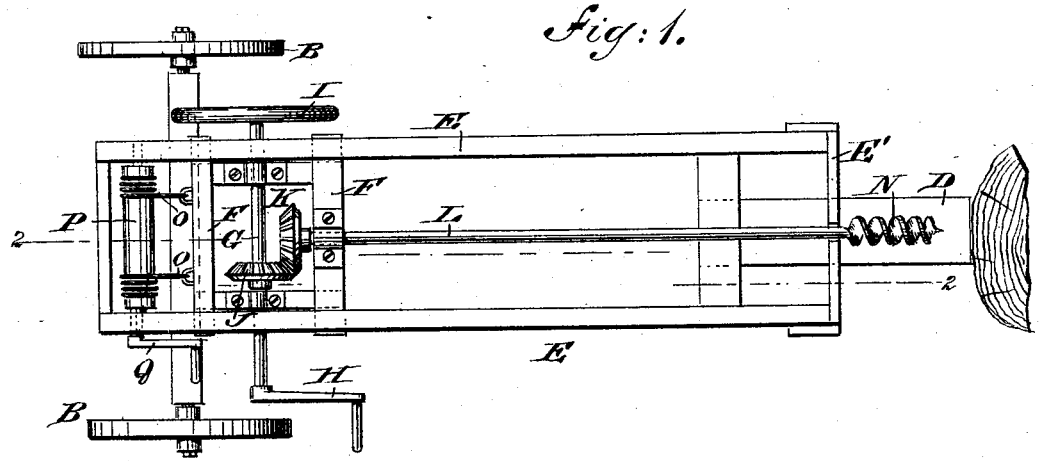
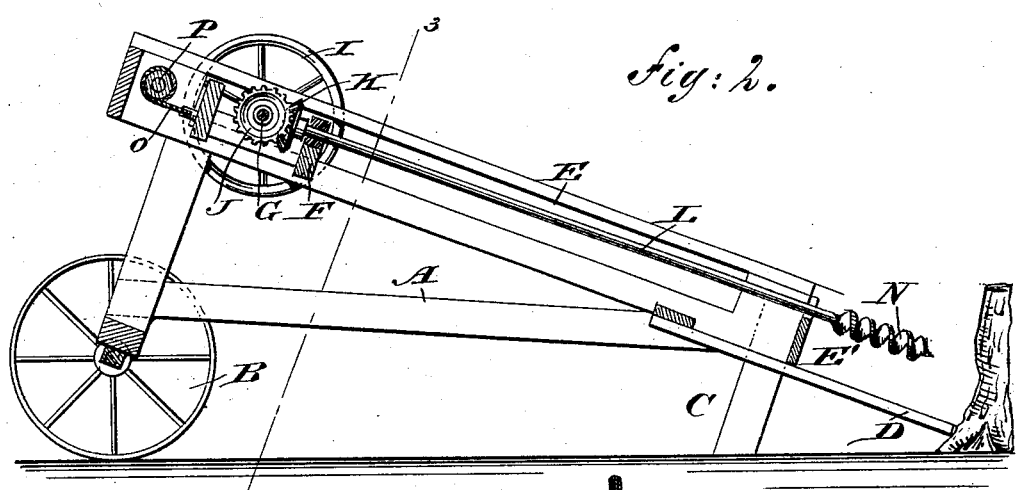
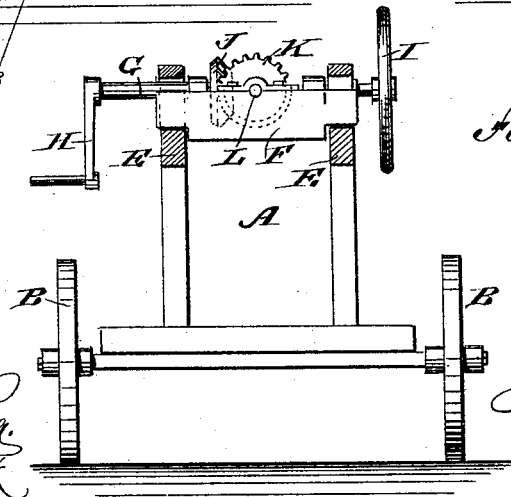
WITNESSES:
Chas. Nida.
C. Sedgwick.
INVENTOR:
J. W. Day
BY Munn & Co.
ATTORNEYS

United States Patent Office.

JONATHAN W. DAY, OF CRYSTAL SPRINGS, MISSISSIPPI.

BORING-MACHINE.

SPECIFICATION forming part of Letters Patent No. 482,231, dated September 6, 1892.

Application filed December 16, 1891. Serial No. 415,251. (No model.)

*To all whom it may concern:*

Be it known that I, JONATHAN W. DAY, of Crystal Springs, in the county of Copiah and State of Mississippi, have invented a new and Improved Boring-Machine, of which the following is a full, clear, and exact description.

The object of my invention is to provide a new and improved boring-machine which is simple and durable in construction, very effective in operation, and arranged to quickly and conveniently bore inclined apertures into the stumps of trees to form draft-channels for burning out the stumps, or for boring apertures in logs, timber, and other articles.

The machine is constructed and adapted to operate as hereinafter set forth.

Reference is to be had to the accompanying drawings, forming a part of this specification, in which similar letters of reference indicate corresponding parts in all the figures.

Figure 1 is a plan view of the improvement. Fig. 2 is a sectional side elevation of the same on the line 2 2 in Fig. 1, and Fig. 3 is a transverse section of the same on the line 3 3 of Fig. 2.

The improved boring-machine is provided with a frame A, mounted at one end on wheels B and provided at its other end with short legs C, adapted to rest on the ground. On this end of the frame A is also arranged a board D, adapted to abut on the stump or other article to be bored, as plainly illustrated in Figs. 1 and 2.

The truck-frame A is provided with two inclined slotted beams E, in which is fitted to slide a frame F, formed on its sides with bearings, in which is journaled a transversely-extending main shaft G, carrying at one outer end a handle H and at its other end a fly-wheel I, the said handle serving to conveniently revolve the said shaft.

On the shaft G within the open frame F is secured a bevel gear-wheel J, in mesh with a like gear-wheel K, secured on the end of a shaft L, journaled in the frame F and extending in an inclined position corresponding to the inclined beams E, previously mentioned. The outer end of the shaft L is supported on a board E', attached to the lower ends of the beams E.

On the extreme outer end of the shaft L is formed or secured an auger N of any approved construction and adapted to bore an aperture in the stump or other article.

The frame F is connected at its upper end with a rope or ropes O, winding on a drum P, journaled in suitable bearings on the upper end of the truck-frame A. On one outer end of the drum P is secured a crank-arm Q to enable the operator to revolve the said drum P to wind up the ropes O, so as to draw the frame F from a lowermost position into an uppermost position on the beams E.

The device is used as follows: When it is desired to bore an aperture, say, in the stump of a tree, the wheeled truck-frame A is placed close to the stump with the board D resting against the stump, as plainly illustrated in Figs. 1 and 2. The sliding frame F is then in an uppermost position, the ropes O being wound upon the drum P of the windlass. The operator now turns the crank-arm H so as to revolve the shaft G, which latter, by the gear-wheels J and K, imparts a rotary motion to the shaft L, and consequently to the auger N, the latter being moved into engagement with the stump of the tree by pressing the frame F slightly downward on its guideways in the beams E. When the auger is once in engagement with the stump of the tree, it bores in the usual manner on the continued revolving of the shaft G. The inward feeding of the auger N causes a downward sliding of the frame F and consequent unwinding of the ropes O from the drum P of the windlass. It will be seen that the shaft L, carrying the auger N, is of sufficient length to permit the operator to bore with the auger N an aperture clear through the stump, the said aperture being inclined according to the inclination of the shaft L. When the aperture has been bored through the stump, the operator stops revolving the shaft G, then takes hold of the crank-arm Q, manipulates the same to wind up the ropes O on the drum P, so as to withdraw the frame F back into an uppermost position, the said frame withdrawing the shaft L and auger N from the aperture bored in the stump. The stump can then be conveniently fired or burned out by a small fire at the lower end of the drilled opening, the latter serving as a draft to the fire, so that the latter readily burns out the stump.

It will be seen that by this device a very long aperture can be bored through thick stumps or other articles of large dimensions. It will further be seen that the boring-machine is very simple and durable in construction, can be readily moved about from place to place, and can conveniently be operated for boring the aperture and withdrawing the auger after the aperture is bored, as above described.

Having thus fully described my invention, I claim as new and desire to secure by Letters Patent—

The improved stump-boring machine composed of the truck-frame having supporting rear wheels and front legs, the slotted ways E E, mounted in inclined position on said frame, and the stop-board D, projecting from their lower end, the frame F, sliding in the ways, the crank-shaft G, passing through them and carrying the gear J centrally and the balance-wheel on one end, the auger L, mounted in the frame F and having miter-gear K, and means for adjusting the auger-carrying frame and its attachments, as shown and described.

J. W. DAY.

Witnesses:
O. H. SPENCE,
ROBT. B. MIMS.